(12) United States Patent
Hegenbart et al.

(10) Patent No.: US 10,724,227 B2
(45) Date of Patent: Jul. 28, 2020

(54) LINING PANEL WITH INTEGRATED ELECTRIC LINES FOR AN AIRCRAFT AND METHOD FOR MANUFACTURING A LINING PANEL

(71) Applicant: Airbus Operations GmbH, Hamburg (DE)

(72) Inventors: Matthias Hegenbart, Hamburg (DE); Peter Linde, Hamburg (DE); Thorsten Steinlicht, Hamburg (DE); Camilla Brodale, Hamburg (DE); Dirk Herzog, Hamburg (DE)

(73) Assignee: Airbus Operations GmbH (DE)

( * ) Notice: Subject to any disclaimer, the term of this patent is extended or adjusted under 35 U.S.C. 154(b) by 351 days.

(21) Appl. No.: 15/442,877

(22) Filed: Feb. 27, 2017

(65) Prior Publication Data

US 2017/0254065 A1  Sep. 7, 2017

(30) Foreign Application Priority Data

Mar. 7, 2016  (EP) .................................... 16158897

(51) Int. Cl.
*B64C 1/06* (2006.01)
*E04B 1/343* (2006.01)
(Continued)

(52) U.S. Cl.
CPC ............ *E04B 1/343* (2013.01); *B29C 64/106* (2017.08); *B29C 70/74* (2013.01); *B29C 70/882* (2013.01);
(Continued)

(58) Field of Classification Search
CPC ......... E04B 1/343; B32B 37/18; B33Y 80/00; B33Y 10/00; B29C 64/106; B29C 70/882;
(Continued)

(56) References Cited

U.S. PATENT DOCUMENTS

2009/0177309 A1\* 7/2009 Kozlak ................... B29C 70/70
700/119
2013/0170171 A1\* 7/2013 Wicker ............... H01L 21/4846
361/809

(Continued)

FOREIGN PATENT DOCUMENTS

EP  2 813 432 A1  12/2014
GB  2 517 465 A  2/2015
(Continued)

OTHER PUBLICATIONS

Search Report EP 16158897.5 (dated Oct. 21, 2016).

*Primary Examiner* — Valentina Xavier
(74) *Attorney, Agent, or Firm* — Lerner, David, Littenberg, Krumholz & Mentlik, LLP

(57) ABSTRACT

A method for manufacturing a lining panel with integrated electric lines for a lining of a passenger cabin of an aircraft or spacecraft includes using an additive manufacturing (AM) or 3D printing technique to form the electric lines on or into a panel body of the lining panel. A lining panel with integrated electric lines for a lining of a passenger cabin of an aircraft or spacecraft includes a panel body and electric lines being formed on or into the panel body using an AM or 3D printing technique.

14 Claims, 3 Drawing Sheets

(51) Int. Cl.
  *B33Y 10/00* (2015.01)
  *B29C 70/88* (2006.01)
  *B29C 70/74* (2006.01)
  *B33Y 80/00* (2015.01)
  *B64C 1/12* (2006.01)
  *B29C 64/106* (2017.01)
  *B64C 1/40* (2006.01)
  *B32B 37/18* (2006.01)

(52) U.S. Cl.
  CPC .............. *B32B 37/18* (2013.01); *B33Y 10/00* (2014.12); *B33Y 80/00* (2014.12); *B64C 1/066* (2013.01); *B64C 1/12* (2013.01); *B64C 1/40* (2013.01); *B64D 2221/00* (2013.01); *Y02T 50/43* (2013.01); *Y02T 50/46* (2013.01)

(58) Field of Classification Search
  CPC .. B29C 70/74; B64C 1/40; B64C 1/12; B64C 1/066; Y02T 50/46; Y02T 50/43; B64D 2221/00
  See application file for complete search history.

(56) References Cited

U.S. PATENT DOCUMENTS

| | | |
|---|---|---|
| 2014/0189989 A1 | 7/2014 | Flitsch |
| 2015/0053662 A1 | 2/2015 | Hu et al. |
| 2015/0053663 A1* | 2/2015 | Sakota ............... B64C 1/12 |
| | | 219/202 |
| 2015/0367955 A1 | 12/2015 | Ngo et al. |
| 2018/0050486 A1* | 2/2018 | Talgorn ............... B29C 70/70 |
| 2018/0215094 A1* | 8/2018 | Birnbaum ............ B22F 3/1055 |
| 2019/0039284 A1* | 2/2019 | Hertling ............... B29C 64/118 |

FOREIGN PATENT DOCUMENTS

| | | |
|---|---|---|
| WO | 9101621 A2 | 2/1991 |
| WO | 2009034557 A2 | 3/2009 |

* cited by examiner

LINING PANEL WITH INTEGRATED ELECTRIC LINES FOR AN AIRCRAFT AND METHOD FOR MANUFACTURING A LINING PANEL

FIELD OF THE INVENTION

The present invention pertains to a lining panel with integrated electric lines for an aircraft or spacecraft and a method for manufacturing a lining panel of this type.

Although generally applicable to any kind of lining panel, e.g. for use in the transport industry in passenger cabins of landborne, airborne, or waterborne vehicles, the present invention and the problem on which it is based will be explained in greater detail with reference to lining panels for passenger cabins of commercial aircraft.

BACKGROUND OF THE INVENTION

Common passenger aircraft comprise a fuselage that holds a passenger cabin, the latter containing the passenger seats, the hand luggage compartments, the sanitary facilities and so on. The inside of such a passenger cabin is usually separated from the fuselage, the skin, and other structural parts of the aircraft by a lining with a plurality of lining panels adjoining one another. The passenger cabin is supplied by a data and power infrastructure that is essentially built up of electrical wiring and corresponding connectors that are often placed between the aircraft structure and the lining panels, such that the electric infrastructure is 'hidden' from the passengers. Specifically, a multitude of wires may be arranged in cable bundles, each wire being solidly formed with a circular profile that is surrounded by an insulation. The cable bundles may be anchored within fixed locations using brackets or similar holding components that in turn may be attached to the lining panels. Typically, strict requirements are put on the functionality, on the temperature and humidity resistance, as well as on the general safety precautions of such an electric infrastructure. Consequently, a strong focus is particularly placed on the robustness of the power and data cabling.

Recently, flexible electronics have been under close scrutiny within the regime of aerospace technology as these potentially offer lightweight and space saving alternatives to common cable systems. To this end, electronic devices may be mounted on flexible plastic substrates to provide flexible and flat cables for data and power transmission. These solutions typically require less space and weight than conventional cables. Moreover, such flat cables may simply be bonded to the outer surfaces of lining panels, wall segments, or the like. However, as in case of conventional cables, these solutions often involve laborious manufacturing and installation processes that are mostly separated from the assembly of the lining panels themselves. Convenient solutions have been suggested recently that integrate conductors directly into panel bodies, e.g. like the one disclosed in document US 2015/0053663 A1.

In general, any weight reduction can have significant impact on aircraft load and, in consequence, fuel consumption. In addition, it is desirable to provide an electric infrastructure with minimal installation and/or production effort. 3D printing provides extraordinary design freedom and hence it is widely used for manufacturing with multiple applications in engineering, construction, industrial design, automotive industries, and aerospace industries. Amongst various advantages, it offers the possibility to integrally form functional and structural elements into components, which otherwise—within conventional manufacturing—would necessarily require elaborate installation efforts.

BRIEF SUMMARY OF THE INVENTION

It is one idea of the invention to provide lightweight solutions for the data and power transmission infrastructure of a passenger cabin offering simple manufacture and installation.

According to a first aspect of the invention, a method for manufacturing a lining panel with integrated electric lines for a lining of a passenger cabin of an aircraft or spacecraft comprises using an additive manufacturing (AM) or 3D printing technique to form the electric lines on or into a panel body of the lining panel.

According to a second aspect of the invention, a lining panel with integrated electric lines for a lining of a passenger cabin of an aircraft or spacecraft comprises a panel body and electric lines being formed on or into the panel body using an AM or 3D printing technique.

According to a third aspect of the invention, an aircraft or spacecraft comprises a lining panel with integrated electric lines according to the second aspect of the invention.

One idea of the present invention is to replace individual electric wires, cable routes or bundles, cable connectors and similar components of an electrical infrastructure of a passenger cabin by integrating electric connections directly into the lining panels of the cabin lining in a (multi-material) printing process. Using 3D printing processes even complexly structured electric connections, or even electric circuitry, may be manufactured directly on or in the panel bodies of the lining panels in cost and time efficient production manner. Due to this fact, lining panels according to the present invention can either replace and/or complement conventional lining panels of a passenger cabin. Various specific configurations of the thus implemented electric lines may be advantageous depending on the application. For example, an electric line may simply be printed on a surface of a panel body, e.g. of a conventionally manufactured lining panel that may not require any particular preparation. However, electric lines may also be partially or fully integrated into a panel body, e.g. such that the electric lines are placed flush with a surface of the panel body, which may be advantageous as the electric lines lie protected within the panel body. In addition, electric insulation of the electric connections may be provided, e.g. directly in the printing process.

The present invention offers a multitude of advantages for the passenger cabin environment. Due to the present invention, separately installed electric wires and cable bundles may be avoided or at least significantly reduced in number. Holding components like brackets or similar may be reduced. In general, huge reductions in weight and space may be achieved. Furthermore, the present invention offers several advantages for the general safety and reliability of an electric infrastructure of a passenger cabin. Electric lines are integrated into the lining panels and hence there is less risk that cables or wires get torn apart or damaged during installation or maintenance. Inspection and maintenance efforts may be reduced on a general basis. Thus, not only weight, costs, installation and manufacturing efforts can be significantly lowered but also the general reliability of an electrical infrastructure of a passenger cabin can be improved.

In general, aspects of the invention offers great advantages for 3D printing or AM technology since 3D components may be printed without the additional need for subjecting the components or objects to further processing steps such as milling, cutting or drilling. This allows for a more efficient, material saving and time saving manufacturing process. Particularly advantageous in general is the reduction of costs, weight, lead time, part count and manufacturing complexity coming along with employing AM technology for printing electric lines, electric circuits or other objects used for, employed in or being part of airborne vehicles. Moreover, the geometric and functional shape of the printed components or objects may be flexibly designed with regard to the intended technical purpose of parts or regions of the component/object.

Free form fabrication (FFF), direct manufacturing (DM), fused deposition modelling (FDM), powder bed printing (PBP), laminated object manufacturing (LOM), stereolithography (SL), selective laser sintering (SLS), selective laser melting (SLM), selective heat sintering (SHS), electron beam melting (EBM), direct ink writing (DIW), digital light processing (DLP) and additive layer manufacturing (ALM) belong to a general hierarchy of additive manufacturing (AM) methods, generally termed as 3D printing techniques. Those systems are used for generating three-dimensional objects based on digital model data by creating a cross-sectional pattern of the object to be formed and forming the three-dimensional solid object by sequentially building up layers of material. Any of such procedures will be referred to in the following description as AM or 3D printing without loss of generality. AM or 3D printing techniques usually include selectively depositing material layer by layer, selectively fusing or solidifying the material and removing excess material, if needed. 3D printing is currently used for prototyping and distributed manufacturing with multiple applications in engineering, construction, industrial design, automotive industries and aerospace industries.

According to an embodiment of the invention, the method may comprise using an AM or 3D printing technique to manufacture the panel body of the lining panel. Hence, the electric lines of the invention may either be printed by a separate 3D printer on a panel body prepared beforehand, e.g. a conventionally manufactured lining panel of a plastic or reinforced plastic material, or some or all of the electric lines may be printed together with the panel body itself in a multi-material printing process. For this, the AM or 3D printing technique may be optimized to employ different materials in a multiple material printing process. The respective 3D printer may be particularly configured to print electrically conductive circuits. In one exemplary embodiment, a powder bed or inkjet head 3D printer may be employed to place highly conductive particles, e.g. silver nanoparticles or other highly conductive metal or metal alloy materials, or highly conductive fibers or filaments on a substrate, e.g. a plastic material or fiber reinforced plastic material including fabric.

Specifically, the electric lines may be simultaneously formed with the manufacturing of the panel body of the lining panel. In this embodiment, the lining panel may be manufactured as one single component in one continuous and rapid additive manufacturing process. Thus, the lining panel of this embodiment may be manufactured in a particularly cost- and time-efficient way.

According to an alternative embodiment, the method may comprise using an automated tape placement technique to manufacture the panel body of the lining panel. In particular, fast manufacturing of the panel body may be achieved by combining rapid fiber- or tape-placement processes in a fast lay-up method. This permits to employ highly efficient pre-pregs with high fiber density, i.e. composite fibers pre-impregnated with a matrix material, such as epoxy, wherein the fibers may be provided in the form of fabric layers or the like. Hence, in a first method step of the invention, the panel body may be manufactured as a composite component by tape placement, e.g. by conventional tape placement methods such as laser assisted tape placement or variants thereof. In a next step of the method, electric lines may then be printed onto or into the panel body to provide a lining panel with integrated electric lines.

According to yet another embodiment of the method, the method may comprise forming circuit channels within the panel body of the lining panel configured to take in the electric lines. In a respective embodiment of the lining panel, the panel body may thus be interspersed by circuit channels, into which the electric lines are formed. For example, a premanufactured panel body may be provided in a tape-placement process. In a next step, a circuit channel may be formed into the panel body by cutting, milling, drilling etc. away material of the panel body, e.g. plastic or reinforced plastic. In a further step, electric lines may then be printed into the thus formed circuit channels.

The circuit channels may be formed by at least one of laser ablation and an AM or 3D printing technique. In order to manufacture the circuit channel precisely and at high speed, the composite material may be evaporated with a laser beam. This may be done, for example, with a pulsed laser or with a continuous laser beam. The person of skill will readily conceive appropriate variants on basis of the individual requirements of the specific application with respect to quality and rapidness. For example, depending on the desired width of the circuit channels, material may be removed in a single pass of the laser, or, alternatively, in multiple passes in succession. A laser beam enables to form circuit channels very precisely and rapidly. In one variant, the laser may be implemented into a print head of a 3D printer such that the electric line may be formed into the circuit channel in direct succession to the extraction of the circuit channel with the laser. However, in other variants, the laser may be a standalone tool that is mechanically separated from the print head. In advantageous embodiments, some or all of the disclosed processes may be combined in various ways into one single continuous production process to increase efficiency. For example, the laser ablation process may be integrated into a tape placement process for manufacturing the panel body of the lining panel. To this end, a laser head may be adapted together with the corresponding optics to form one single system in conjunction with the tape placement head. Here, the laser could be guided by a suitable laser scanner optic or equivalent to achieve optimal geometrical freedom to produce the circuit channels. Another variant could be to integrate a laser head in front of a ink-jet or 3D-print head.

According to an embodiment of the lining panel, each electric line may be configured as at least one of a data circuit and a power circuit. AM or 3D printing technologies generally allow to print electronic circuitry, circuit boards and other electronic structures by employing highly conductive 3D printing filaments or the like and combine them with known insulating materials. The circuits may be printed directly onto a range of common panel body materials: plastics, fiber reinforced plastic or similar. In principle, it is even possible to print circuits directly onto a fabric. Costs are much lower than in case of conventional cables or the like as the product is made in a single process, without the need for individual component assembly. By employing rapid 3D printing techniques electric lines may be configured for each individual use case. In one example, electric lines may be customized as power circuits to transmit electric energy through the lining panel for powering various electric cabin components, like for example cabin lights, displays, passenger service units, general passenger electronics, safety-related terminals, flight attendant panels or the like or other components of a typical cabin management system. In other variants, electric lines may be set up to transmit entertainment data, safety-related data, video data, audio data or the like, e.g. within a cabin management system and complying with the standards of a typical cabin intercommunication data system or similar. However, by virtue of the 3D printing process even very general electric lines may be printed that are used to transmit data and power.

Each electric line may be formed in a generally planar configuration. Hence, power circuits and data circuits may be implemented into a panel body with minimum space requirements and with minimum interference with the structural integrity of the panel body.

The electric lines may be formed in circuit layers on or in the panel body of the lining panel such that individual circuit layers are separated from each other by insulation layers formed from insulating material of the panel body. Hence, multiple layers of alternating insulation layers and circuit layers with data circuits and power circuits may be easily achieved.

According to embodiments of the invention, the electric lines may be configured as electric circuits. AM or 3D printing methods not only allow to print general electric lines or electric traces, e.g. as data lines and/or power lines, but in addition complex electronic circuitry may formed including not only electric line connections but also more complex electronic components such as resistors, transistors, capacitors, inductors, etc. In principle, complex integrated circuits may be formed onto or into a panel body using AM or 3D printing methods.

Specifically, the panel body may be formed from at least one of a plastic material and a fiber reinforced plastic material. Hence, the panel body may be, for example, formed as a rigid plastic component, e.g. a thermoset or a thermoplastic. As an alternative, the panel body may however also be formed as a fiber reinforced plastic component, e.g. a fiber reinforced polymer like a thermoset resin, i.e. epoxy, that contains fibers of aramid, glass or carbon or similar.

BRIEF DESCRIPTION OF THE DRAWINGS

The invention will be explained in greater detail with reference to exemplary embodiments depicted in the drawings as appended.

The accompanying drawings are included to provide a further understanding of the present invention and are incorporated in and constitute a part of this specification. The drawings illustrate the embodiments of the present invention and together with the description serve to explain the principles of the invention. Other embodiments of the present invention and many of the intended advantages of the present invention will be readily appreciated as they become better understood by reference to the following detailed description. The elements of the drawings are not necessarily to scale relative to each other. Like reference numerals designate corresponding similar parts.

Figure 1A:
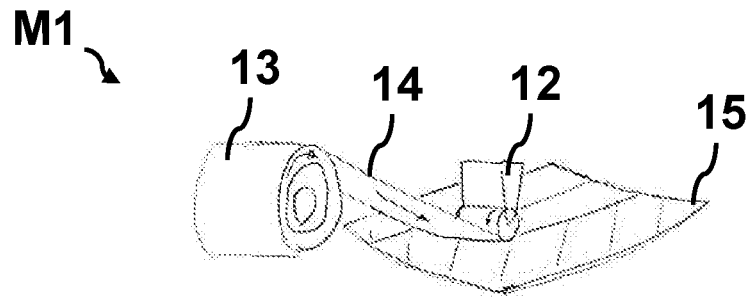
FIGS. 1a-d schematically illustrate individual steps of a method for manufacturing a lining panel according to an embodiment of the invention.

In the figures, like reference numerals denote like or functionally like components, unless indicated otherwise. Any directional terminology like "top", "bottom", "left", "right", "above", "below", "horizontal", "vertical", "back", "front", and similar terms are merely used for explanatory purposes and are not intended to delimit the embodiments to the specific arrangements as shown in the drawings.

Although specific embodiments have been illustrated and described herein, it will be appreciated by those of ordinary skill in the art that a variety of alternate and/or equivalent implementations may be substituted for the specific embodiments shown and described without departing from the scope of the present invention. Generally, this application is intended to cover any adaptations or variations of the specific embodiments discussed herein.

DETAILED DESCRIPTION

Figure 4:
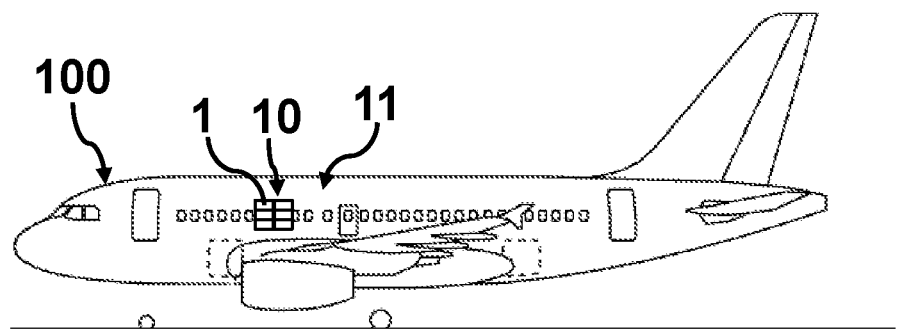
FIG. 4 schematically shows a passenger aircraft with a passenger cabin cladded with a plurality of lining panels according to FIGS. 1-3.

With reference to FIGS. 1a-d of the drawings, individual steps M1, M2, M3 of a method M for manufacturing a lining panel 1 according to an embodiment of the invention are shown. The lining panel 1 is configured to be adjoined to similar lining panels 1 to form the lining 10 of a passenger cabin 11 of a passenger aircraft 100, e.g. like the exemplary one depicted in FIG. 4. For example, the lining panel 1 may be customized as a wall panel, a floor panel, or, for example, a ceiling panel for separating the interior space of the passenger cabin 11 from the structural part and the infrastructure of the aircraft 100. In another embodiment, the lining panel 1 may be customized as a cover for a hatrack or similar stowage space or the like. In the following, the term lining panel 1 generally refers to any lining panel or cladding panel generally known from the interior design of aircraft passenger cabins 11, i.e. components that may serve a basic paneling function for functional or decoration purposes and in addition may provide additional structural or functional advantages. For example, a lining panel 1 configured as a wall panel may be customized to provide sound absorption as well as temperature insulation. Hence, lining panels 1 according to the invention may be configured for various and different purposes and applications. Thus, the person of skill will be aware that the exemplary embodiments of lining panels 1 and methods M of manufacturing the same described in the following paragraphs merely serve to illustrate the technical teaching of the present invention but should not limit the properties of the lining panels 1 beyond the purpose of the present invention.

The method M according to FIGS. 1a-d comprises three basic steps M1, M2, M3 that may be reiterated as often as required and in different sequence from the one shown. The method M comprises under M1 using an automated tape placement technique to manufacture the panel body 3 of the lining panel 1. The tape placement technique may be, for example, a rapid fiber- or tape-placement process as it is known from the production of plastic components, composite preforms and/or the fabrication of fiber-reinforced composite components. The tape placement may comprise drawing tapes 14 from a tape spool 13 and placing the tapes 14 on a support surface or similar, where the tapes 14 are superimposed upon another to form a preform 15, i.e. a semi-finished component. The tapes 14 are laid down by a tape placement head 12 that presses each tape 14 onto the already placed tapes 14. The individual tapes 14 may consist of one or more layers of tape material, e.g. layers of a continuous web, such as strip or sheet material, or layers made of fabric impregnated with a curable material, like epoxy resin or the like. The individual layers of material may be essentially the same or may differ from one another depending on the specific requirements for the tape 14 and/or the lining panel 1. The person of skill will be aware that various manufacturing processes for the fabrication of plastic or composite panels may be used in the method of this embodiment of the invention. Hence, in a first method step of the embodiment, the panel body 3 may be particularly manufactured as a composite component by tape placement, e.g. by conventional tape placement methods such as laser assisted tape placement or variants thereof. The method step under M1 may particularly comprise consolidating, curing or hardening the semi-finished component into a (fiber-reinforced) composite component to form the panel body 3.

Figure 1B:
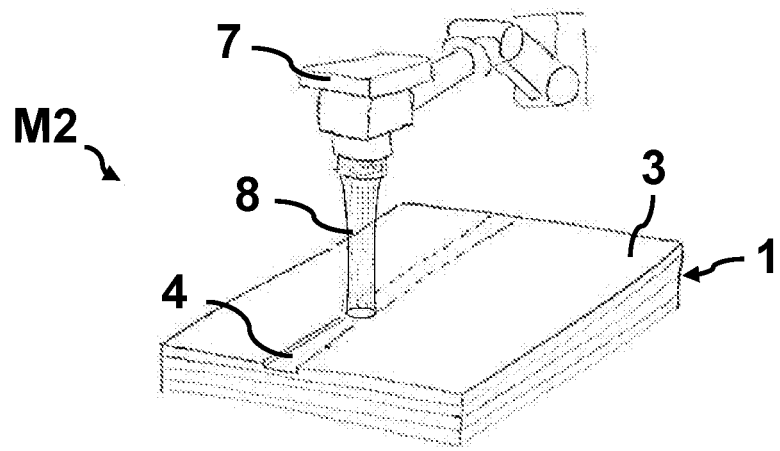

With reference to FIG. 1b in particular, the method M further comprises under M2 forming circuit channels 4 within the panel body 3 of the lining panel 1 configured to take in electric lines 2. The circuit channels 4 are formed by laser ablation, wherein the material of panel body 3 is evaporated along a line or curve by a laser beam 8 provided by a laser head 7 to form a recess that constitutes the circuit channel 4. This may be done, for example, with a pulsed laser beam 8 or with a continuous laser beam 8. Depending on the desired width and/or depth of the circuit channels 4, material may be removed in a single pass of the laser beam 8, or, alternatively, in multiple passes in succession. The person of skill will readily conceive appropriate variants on basis of the individual requirements of the specific application with respect to quality and rapidness.

Figure 1C:
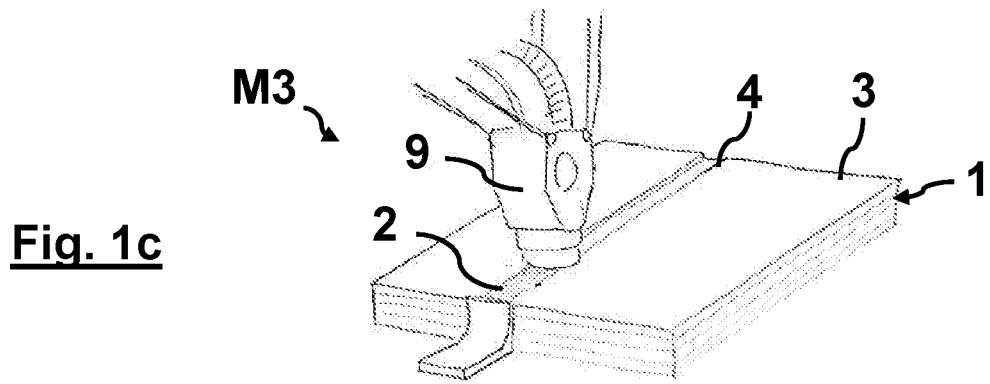

Referring now to FIG. 1c of the drawings, the method M further comprises under M3 using an additive manufacturing (AM) or 3D printing technique to form electric lines 2 on or into the panel body 3 with a 3D print head 9. For this, the AM or 3D printing technique may be optimized to employ different materials in a multiple material printing process. In the embodiment shown here, the electric lines of the invention are printed by a separate 3D print head 9 of a separate 3D printer on a panel body 3 prepared beforehand by the tape-placement process. The respective 3D printer is particularly configured to print electrically conductive circuits. In one exemplary embodiment, a powder bed or inkjet head 3D printer may be employed to place highly conductive particles, e.g. silver nanoparticles or other highly conductive metal or metal alloy materials, or highly conductive fibers or filaments on the panel body 3. Once the electric lines 2 are placed, it is possible to place more layers of tape material on top of the panel body 3 and the electric lines 2, and, thus, to reiterate the method step under M1 to M3 until a panel body 3 with a plurality of circuit layers 2 is formed that may be positioned in various layers and orientations. In this respect, FIG. 1d depicts the final lining panel 1 after forming one or several electric lines 2.

Figure 1D:
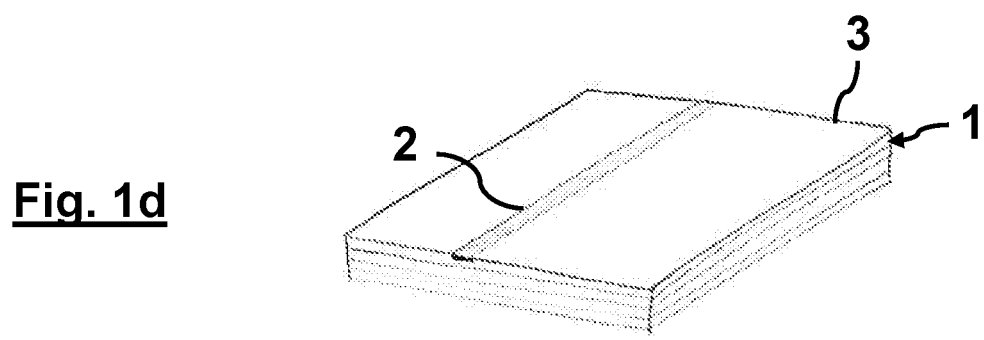

The lining panel 1 depicted in FIG. 1d may replace and/or complement conventional lining panels of a passenger cabin 11 of an aircraft 100. The electric lines 2 particularly dispense with the need for individual electric wires, cable routes or bundles, cable connectors and similar components of an electrical infrastructure of a passenger cabin 11 as they are conventionally used. In the case of the present invention, electric lines are directly implemented into the lining panels 1 of the cabin lining 10 in a (multi-material) printing process. Using 3D printing processes according to the present invention even complexly structured electric lines or electric circuitry may be manufactured directly on or in the panel bodies 3 of the lining panels 1 in cost and time efficient production manner.

Like this, electric wires and cable bundles and the like, as well as brackets and other holding components may be avoided or at least significantly reduced in number. In general, huge reductions in weight and space may be achieved. Electric lines may be fully integrated into the lining panels 1 and hence the electric infrastructure is less vulnerable to mechanical or other influences or damage. Thus, not only weight, costs, installation and manufacturing efforts can be significantly lowered but also the general reliability of a lining 10 of a passenger cabin 11 can be improved.

Figure 2:
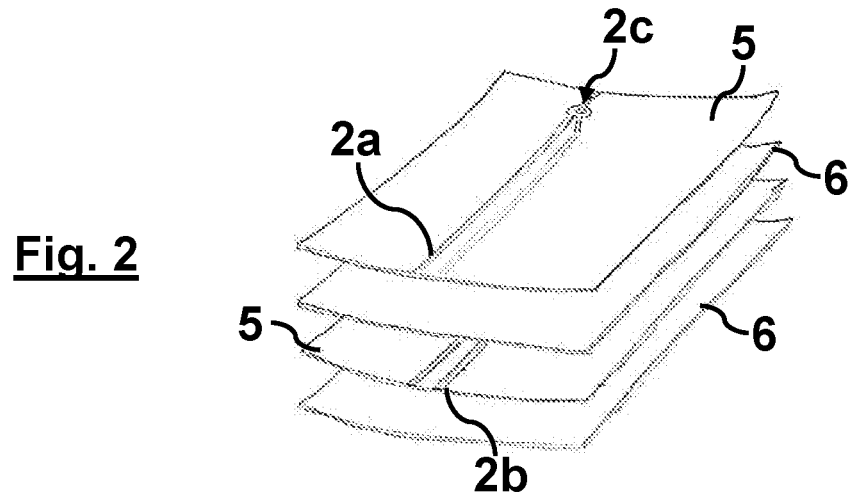
FIG. 2 schematically shows different layers of a lining panel according to another embodiment of the invention.

FIG. 2 illustrates that the method according to FIGS. 1a-d may be used to fabricate lining panels 1 with various configurations of the electric lines 2. In this embodiment, alternating layers of insulating material 6 (e.g. a plastic) and circuit layers 5 are formed, wherein the circuit layers 5 comprise electric lines 2 that are formed either as planar data circuits 2a or power circuits 2b (in principle, of course, also combined power and data circuits may be provided). Hence, a panel with multiple circuits may be provided, in which flat electric lines 2 are implemented in a space saving manner that does not affect the overall structure, in particular the mechanical integrity of the lining pane 1 in any significant way.

Figure 3A:
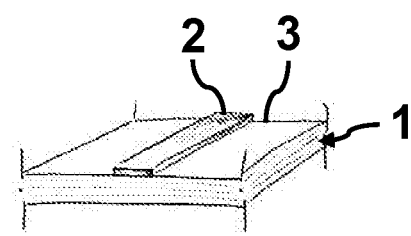
FIGS. 3a-f schematically show lining panels manufactured with a method according to FIGS. 1a-d according to different embodiments of the invention.
Figure 3B:
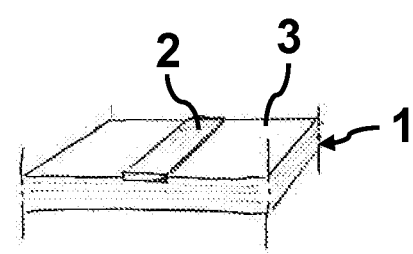
Figure 3C:
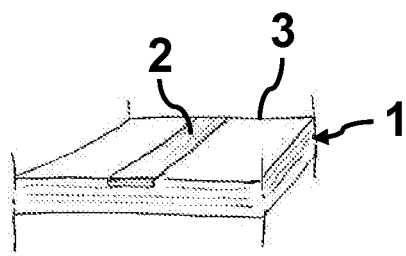
Figure 3D:
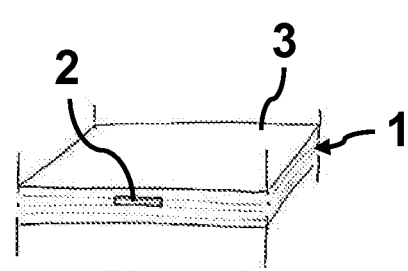
Figure 3E:
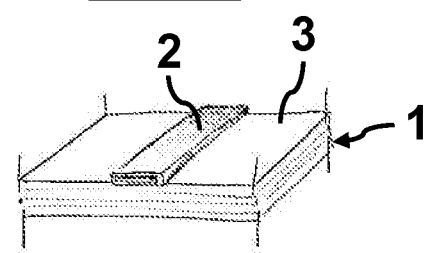
Figure 3F:
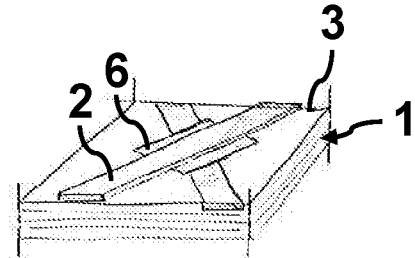

In a similar vein, FIGS. 3a-f schematically show lining panels 1 manufactured with a method M according to FIGS. 1a-d according to different embodiments of the invention. In this case, one or several electric lines 2 are printed on a surface of a panel body 3 as in FIGS. 1a-d. It is shown that there are various ways to configure the electric lines 2 within the panel body 3, e.g. on top of the panel body 3 as in FIG. 3a, partially embedded into the panel body 3 as in FIG. 3b, embedded into a panel body 3 such that the electric line 2 ends flush with a surface of the panel body 3 as in FIG. 3c, or fully embedded into the panel body 3 as in FIG. 3d. FIG. 3e shows a configuration of the electric line 2 that features a hollow structure being robust against overheating, while FIG. 3f shows two electric lines 2 that are placed on top of each other with an insulation layer 6 placed between.

Figure 5:
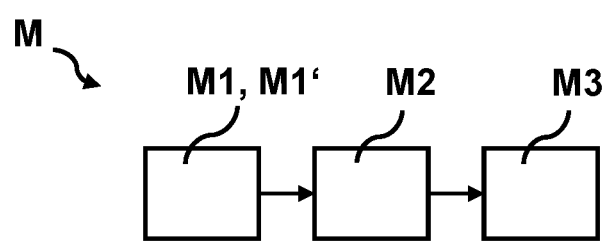
FIG. 5 shows a flow diagram of a method for manufacturing a lining panel according to yet another embodiment of the invention.

Referring now to FIG. 5, a flow diagram of a method M for manufacturing a lining panel 1 according to yet another embodiment of the invention is shown. As in the methods M described in reference to FIGS. 1-4, the method M may comprise under M 1 using an automated tape placement technique to manufacture the panel body 3 of the lining panel 1. However, as an alternative, the method M may also comprise under M1' using an AM or 3D printing technique to manufacture the panel body 3 of the lining panel 1. Next, the method M comprises under M2 forming M2 circuit channels 4 within the panel body 3 of the lining panel 1 configured to take in the electric lines 2 and under M3 using an additive manufacturing, AM, or 3D printing technique to form the electric lines 2 on or into a panel body 3 of the lining panel 1.

Hence, the embodiment of FIG. 5 provides the possibility to manufacture the complete lining panel 1 with the help of 3D printing processes. It may be particularly advantageous to implement the method M of FIG. 5 in one single integrated, multi-material 3D printing method, wherein the panel body 3 and the electric lines 2 are formed simultaneously by one 3D printer with one or several print heads. In one embodiment, such the 3D printer may for example be configured as a powder bed or inkjet head 3D printer and may be able to place highly conductive particles, e.g. silver nanoparticles or other highly conductive metal or metal alloy materials, or highly conductive fibers or filaments on a substrate material (forming the panel body 3), e.g. a plastic material or fiber reinforced plastic material. Like this, even highly complex and intricate panel and circuit configurations can be manufactured in a relatively straightforward way, configurations that may be impossible or nearly impossible to realize by means of conventional cables, connectors and panels.

In the foregoing detailed description, various features are grouped together in one or more examples or examples with the purpose of streamlining the disclosure. It is to be understood that the above description is intended to be illustrative, and not restrictive. It is intended to cover all alternatives, modifications and equivalents. Many other examples will be apparent to one skilled in the art upon reviewing the above specification.

The embodiments were chosen and described in order to best explain the principles of the invention and its practical applications, to thereby enable others skilled in the art to best utilize the invention and various embodiments with various modifications as are suited to the particular use contemplated. In the appended claims and throughout the specification, the terms "including" and "in which" are used as the plain-English equivalents of the respective terms "comprising" and "wherein," respectively. Furthermore, "a" or "one" does not exclude a plurality in the present case.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A method for manufacturing lining panels with integrated electric lines for a lining of a passenger cabin of an aircraft or spacecraft, comprising:
using an additive manufacturing (AM) or 3D printing technique to form the electric lines on or into a panel body of at least a first of the lining panels and a panel body of a second of the lining panels such that electric lines of the first lining panel are configured to be in electrical communication with the electric lines of the second lining panels when the first lining panel is adjoined to the second lining panel,
wherein at least one of the first lining panel and the second lining panel comprises alternating layers of insulating material and circuit layers comprising the electric lines.

2. The method according to claim 1, further comprising: using an AM or 3D printing technique to manufacture the panel body of the first lining panel.

3. The method according to claim 2, wherein the electric lines are simultaneously formed with the manufacturing of the panel body of the first lining panel.

4. The method according to claim 1, further comprising: using an automated tape placement technique to manufacture the panel body of the first lining panel.

5. The method according to claim 1, further comprising: forming circuit channels within the panel body of the first lining panel configured to take in the electric lines.

6. The method according to claim 5, wherein the circuit channels are formed by at least one of laser ablation and an AM or 3D printing technique.

7. The method according to claim 1, wherein the electric lines are configured as electric circuits.

8. A lining panel with integrated electric lines for a lining of a passenger cabin of an aircraft or spacecraft, the lining panel comprising:
a panel body; and
electric lines being formed on or into the panel body using an AM or 3D printing technique, the electric lines configured to be in electrical communication with electric lines of a second adjoining lining panel,
wherein the electric lines are formed in circuit layers on or in the panel body of the first lining panel such that individual circuit layers are separated from each other by insulation layers formed from insulating material of the panel body.

9. The lining panel according to claim 8, wherein the panel body is interspersed by circuit channels, into which the electric lines are formed.

10. The lining panel according to claim 8, wherein each electric line is configured as at least one of a data line and a power line.

11. The lining panel according to claim 8, wherein each electric line is formed in a generally planar configuration.

12. The lining panel according to claim 8, wherein the panel body is formed from at least one of a plastic material and a fiber reinforced plastic material.

13. The lining panel according to claim 8, wherein the electric lines are configured as electric circuits.

14. An aircraft or spacecraft comprising at least a first lining panel with integrated electric lines and a second lining panel with integrated electric lines, each of the first and second lining panels comprising:
a panel body; and
electric lines being formed on or into the panel body using an AM or 3D printing technique such that the electric lines of the first lining panel and the second lining panel are configured to be in electrical communication with one another when the first lining panel is adjoined to the second lining panel,
wherein the electric lines are formed in circuit layers on or in the panel body of the first lining panel such that individual circuit layers are separated from each other by insulation layers formed from insulating material of the panel body.

* * * * *